United States Patent Office 3,711,266
Patented Jan. 16, 1973

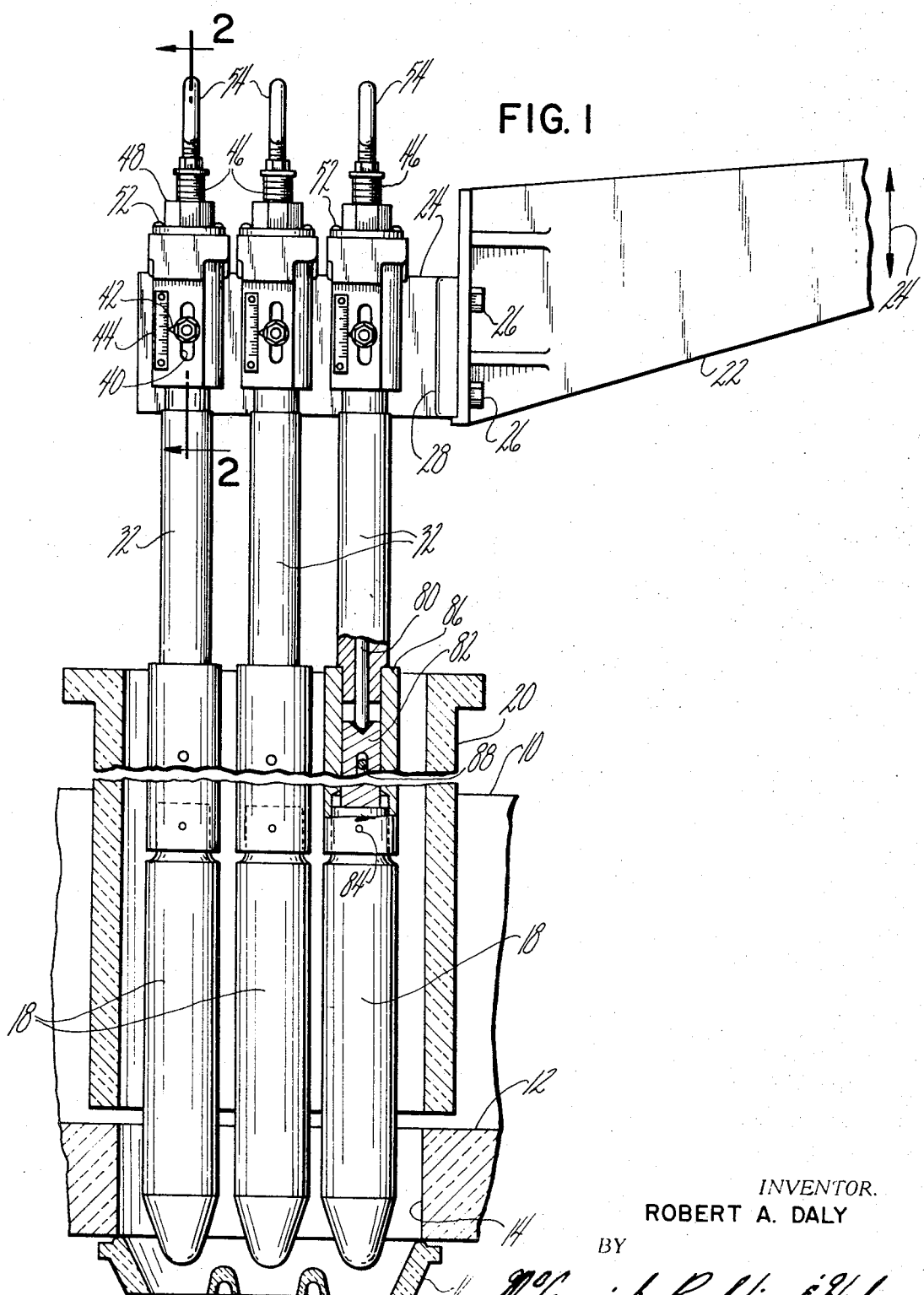

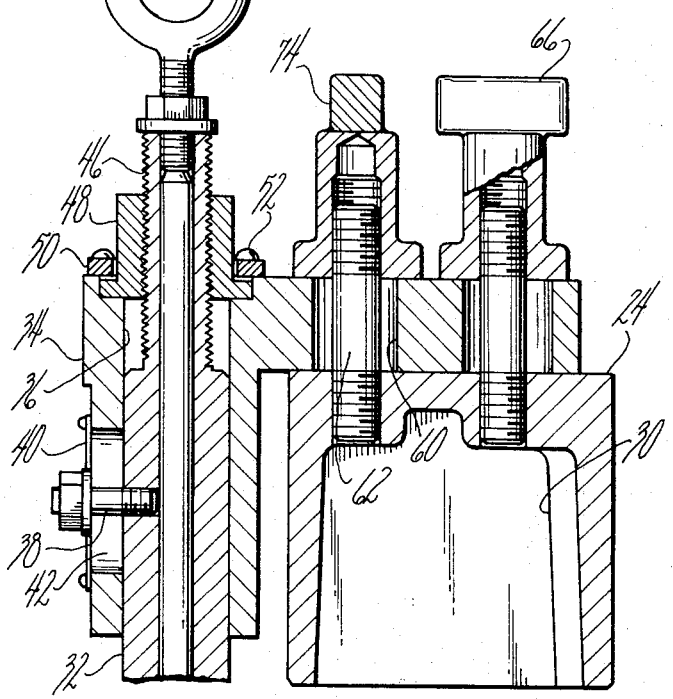
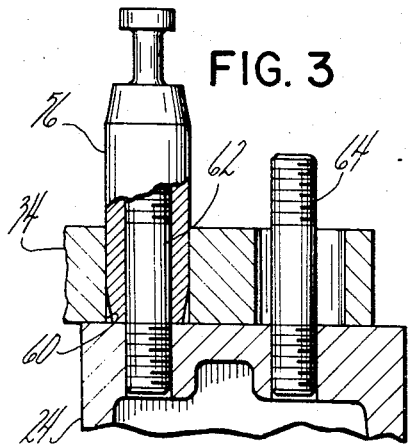
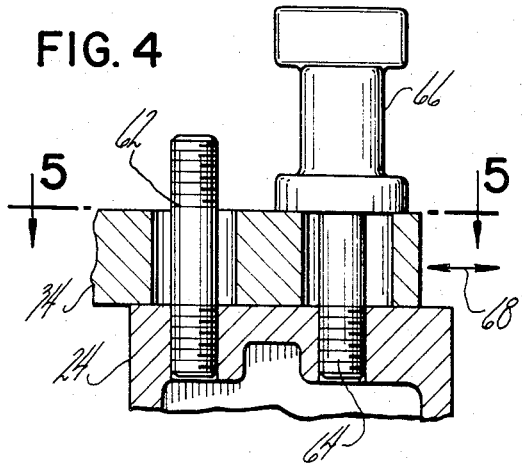
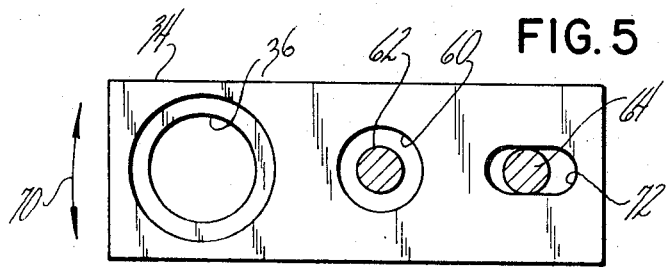

3,711,266
PLUNGER SUPPORT MEANS FOR MOLTEN GLASS FEEDER
Robert A. Daly, West Hartford, Conn., assignor to Emhart Corporation, Bloomfield, Conn.
Continuation of abandoned application Ser. No. 5,868, Jan. 26, 1970, which is a continuation-in-part of application Ser. No. 750,843, Aug. 7, 1968. This application May 12, 1971, Ser. No. 142,753
Int. Cl. C03b 5/26, 9/40
U.S. Cl. 65—328          1 Claim

ABSTRACT OF THE DISCLOSURE

A molten glass feeder has a conventional feeder bowl with an outlet spout in which a triple gob orifice plate is provided so that three plungers, mounted in depending, side-by-side relationship, can be reciprocated vertically for forming gobs of glass in the orifice plate. Each plunger is mounted in a chuck, which is in turn adjustably mounted vertically in a support bracket having an opening and a threaded nut for receiving the plunger chuck. Each support bracket has two oversized openings for loosely receiving two threaded studs which studs are threadably secured in a head carried on a conventional reciprocating plunger carrier. The plungers can be located in their nominal positions by using locating pins and then anchored in final positions by suitable stud means. In one version of the support bracket the plunger chucks are mounted in a circular plate, which plate can be angularly located in the head portion of the carrier to permit all of the plungers to be rotated collectively for set-up purposes.

SUMMARY OF INVENTION

CROSS-REFERENCE TO RELATED APPLICATIONS

This application is a continuation of application Ser. No. 5,868 entitled Plunger Support Means for Molten Glass Feeder, filed Jan. 26, 1970; which application is in turn a continuation of application Ser. No. 750,843 entitled Plunger Support Means for Molten Glass Feeder, filed Aug. 7, 1968, all applications being in the name of Robert A. Daly.

This invention relates to plunger support means for molten glass feeders, and deals more particularly with a novel mechanism for individually supporting a plurality of plungers in a feeder bowl so that each can be individually adjusted with respect both to the bowl and to the other plungers for proper alignment with a plural charge orifice plate.

A general object of the present invention is to provide a plunger support means for a molten glass feeder wherein the plunger support mechanism permits both vertical adjustment of the individual plungers, and also permits each plunger to be adjusted horizontally with respect to the other plungers, and with respect to the feeder bowl.

Another general object of the present invention is to provide a plunger support means for a molten glass feeder wherein a novel support head is adapted for mounting either one, two, or three plungers, and wherein these plungers can be arranged either on the center line of the forehearth or at 90 degrees thereto.

BRIEF DESCRIPTION OF THE DRAWINGS

FIG. 1 is an elevational view of a plunger support means constructed in accordance with the present invention and showing the feeder bowl orifice plate and revolving tube in section.

FIG. 2 is a sectional view taken on the line 2—2 of FIG. 1.

FIG. 3 shows a portion of the mechanism of FIG. 2 with a locating pin being provided in place of one of the threaded stud means of FIG. 2.

FIG. 4 is a view similar to FIG. 3 with the locating pin removed.

FIG. 5 is a sectional view taken on the line 5—5 of FIG. 4.

DETAILED DESCRIPTION

Figure 6:
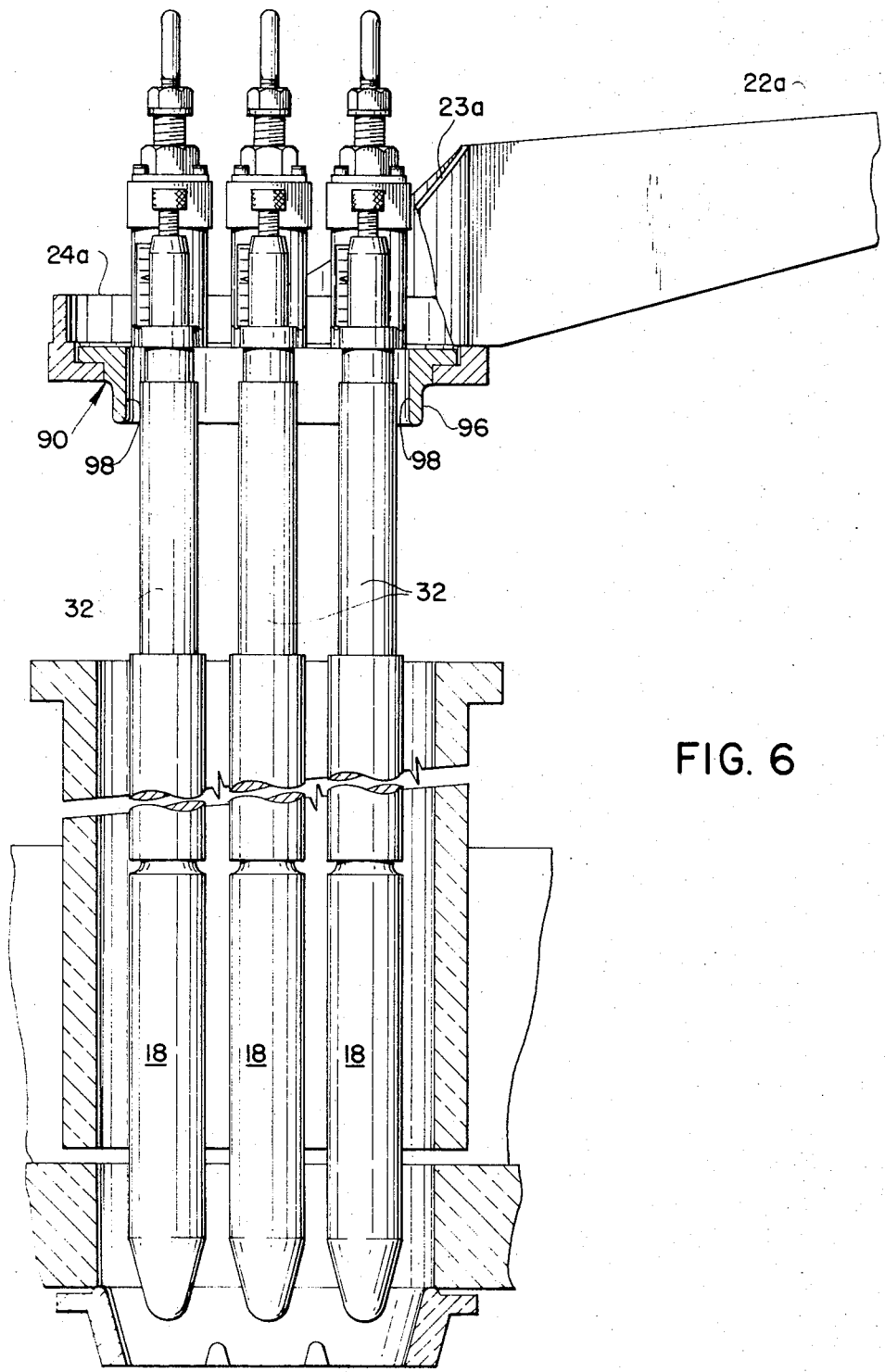
FIG. 6 is an elevational view of an alternative design for a plunger support means constructed in accordance with the present invention.

Turning now to the drawings in greater detail, FIG. 1 shows a glass feeder bowl 10 of the type normally provided at the downstream end of a glass forehearth furnace (not shown) for producing a continuous supply of molten glass to the feeder bowl. The feeder bowl 10 has a lower wall 12 which defines an outlet spout 14, and a triple gob orifice plate 16 is provided adjacent the outlet spout to provide a discharge of feed well of substantial depth through which the molten glass can be forced by conventional reciprocating action of the plungers 18, 18. In the example shown, three orifices are arranged in side-by-side relationship in the orifice plate 16 and three plungers are provided for movement from and to the lowered position shown in FIG. 1. A revolving tube 20 is provided with its lower end portion in spaced relationship to the lower wall of the feeder bowl 12 for allowing predetermined quantities of molten glass to be fed from the feeder bowl into the well defined by the outlet spout 14 and orifice plate 16. A reciprocating plunger carrier 22 is provided for movement in the direction of the arrow 21 so as to achieve the above-described motion of the plungers 18, 18 in timed relationship with the operation of a glassware forming machine (not shown). The particular mechanism for so reciprocating the plunger carrier 22 and for rotating the tube 20 does not comprise the novel part of the present disclosure, and the reader is referred to Pat. No. 2,749,665, issued to Peiler June 12, 1956, for a more complete description of the conventional components of the present invention.

In accordance with one presently preferred embodiment of the carrier 22 includes a head portion 24 which is removably secured to the end of the carrier by a plurality of screws 26, 26. As best shown in FIG. 2, the head portion 24 can be secured to the carrier in a plurality of positions for accommodating a plurality of plungers arranged either in pairs or in groups of three as in the embodiment shown in FIG. 1. With further reference to the head portion 24, it is a feature of the present invention that the plungers might be arranged 90 degrees to the position shown in FIG. 1 by attaching another wall of the head portion 24 to the flanged end of the carrier 22. More particularly, the head portion 24 includes a leg 28 for receiving the screws 26, 26, as shown in FIG. 1. However, the rear wall 30 of the head portion 24, best shown in FIG. 2, is also adapted to receive a plurality of screws 26, 26 for arranging the set of three plungers 18, 18 in a position oriented 90 degrees from that shown in FIG. 1.

In further accordance with the present invention, each plunger 18 is mounted in a plunger chuck 32; which chuck serves to support the refractory portion of the plunger 18 from the carrier in a manner to be described. An L-shaped chuck support bracket 34 is associated with each plunger chuck 32 for adjustably mounting the chuck and its support to the carrier head portion. As best shown in FIG. 2, the L-shaped chuck support bracket 34 is provided with a vertical opening 36 in which the chuck 32 is slidably received for limited vertical adjusting movement above and below the position shown. A stop screw 38 mounted in the chuck 32 is slidably received in a slot 40 in the depending leg of the chuck support bracket 34 for restraining the plunger chuck 32 to sliding motion within predetermined limits. A marker 42 carried by the screw 38 is used in conjunction with a scale 44 on the chuck support bracket 34 in order to pre-position the plunger 18 in a predetermined vertical position. The upper end portion of each plunger chuck 32 is threaded as indicated generally at 46, and this threaded portion 46 is received in a nut 48 rotatably confined in the chuck support bracket by an annular ring 50 screwed to the support bracket 34 by cap screws 52, 52. As so constructed and arranged, when the screw 38 is loosened rotation of the nut 48 serves to raise and lower the plunger chuck 32 in the support bracket 34 to achieve vertical adjustment of the plunger 18 with respect to the orifice plate 16. In order to aid in the mounting of the plunger chucks 32, 32 and their respective support brackets 34, 34 eye bolts 54, 54 are provided in the upper end of each of the threaded portions 46, 46. Each plunger chuck 32 includes a rod 80 which can be urged downwardly by tightening the eye bolt 54 to press a spacer 82 into contact with the upper end of the refractory plunger 18. The latter is pinned at 84 to a cylinder 86 with an oversize opening in the plunger, and the spacer 82 is similarly pinned as shown at 88. Thus, the rod 80 serves to prevent relative movement between the plunger chuck 32 and the refractory plunger itself.

In still further accordance with the present invention, means is provided for adjustably mounting the L-shaped chuck supports 34, 34 to the carrier head portion 24. Preferably, and in the embodiment shown in the drawings, said means comprises locating pin means 56, best shown in FIG. 3, for initially locating each support 34 with respect to the carrier head portion 24 in a nominal position. This locating pin means 56 includes a barrel portion adapted to be snugly received in a circular opening 60 provided for this purpose in the horizontally extending leg of the support bracket 34, and said barrel surrounds a threaded stud 62 which is threadably secured in the head portion 24 of the plunger carrier. A second threaded stud 64 carries a hand-knob 66 (FIG. 4) for releasably clamping the chuck support 34 to the carrier head portion in the nominal position located in the manner shown in FIG. 3.

Still with reference to FIG. 4, it will be apparent that upon removal of the barrel portion of the locating pin means 56 the chuck support bracket 34 can be tapped slightly in the direction of the arrow 68 to reposition the associated plunger 18 toward or away from the carrier head portion 24. With reference to FIG. 5, it will also be apparent that the chuck support bracket 34 can also be pivoted about the second stud 64 for movement in the direction of the arrow 70 for moving its associated plunger 18 in a direction generally perpendicular to the direction of the arrow 68. Thus, minor adjustments can be made in the positions of each of the plungers 18, 18 while the chuck support bracket 34 is loosely clamped as the result of the hand-screw 66 associated with the second stud 64. The elongated slot 72 in the horizontally extending leg of the chuck support bracket 34 facilitates this minor mechanical adjustment of each plunger.

Once the final position of each of the plungers 18, 18 is accomplished through the adjustments described hereinabove, a hand-knob 74 is threadably received on the first stud 62 for securely clamping the chuck support bracket 34 in the desired position. Once the hand-knob 66 has been similarly clamped, it will be apparent that the position of the associated plunger 18 will be firmly established for accomplishing its reciprocatory motion in feeding molten glass charges through the charge forming openings in the orifice plate 16.

From the foregoing description, it will be apparent that not only can the carrier head portion 24 be used for so-called center line of the forehearth, but by mounting the head portion 24 at 90 degrees to the position shown the aligned plungers 18, 18 can be mounted in a position 90 degrees to that shown. It will also be apparent to those skilled in the art that one, two, or three plungers can be mounted on the carrier head portion 24 in either of the two positions mentioned above merely by providing suitable sets of threaded openings for receiving the first and second stud means 62 and 64 associated with each plunger chuck support bracket 34. A still further advantage resides in the fact that these supports, together with their associated plungers, can be installed and removed individually.

Figure 7:
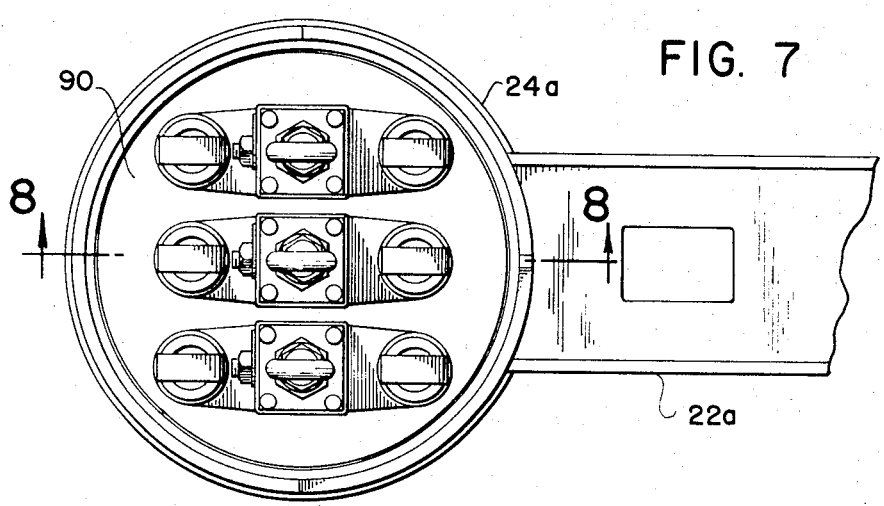
FIG. 7 is a plan view of the plunger support means shown in FIG. 6.
Figure 8:
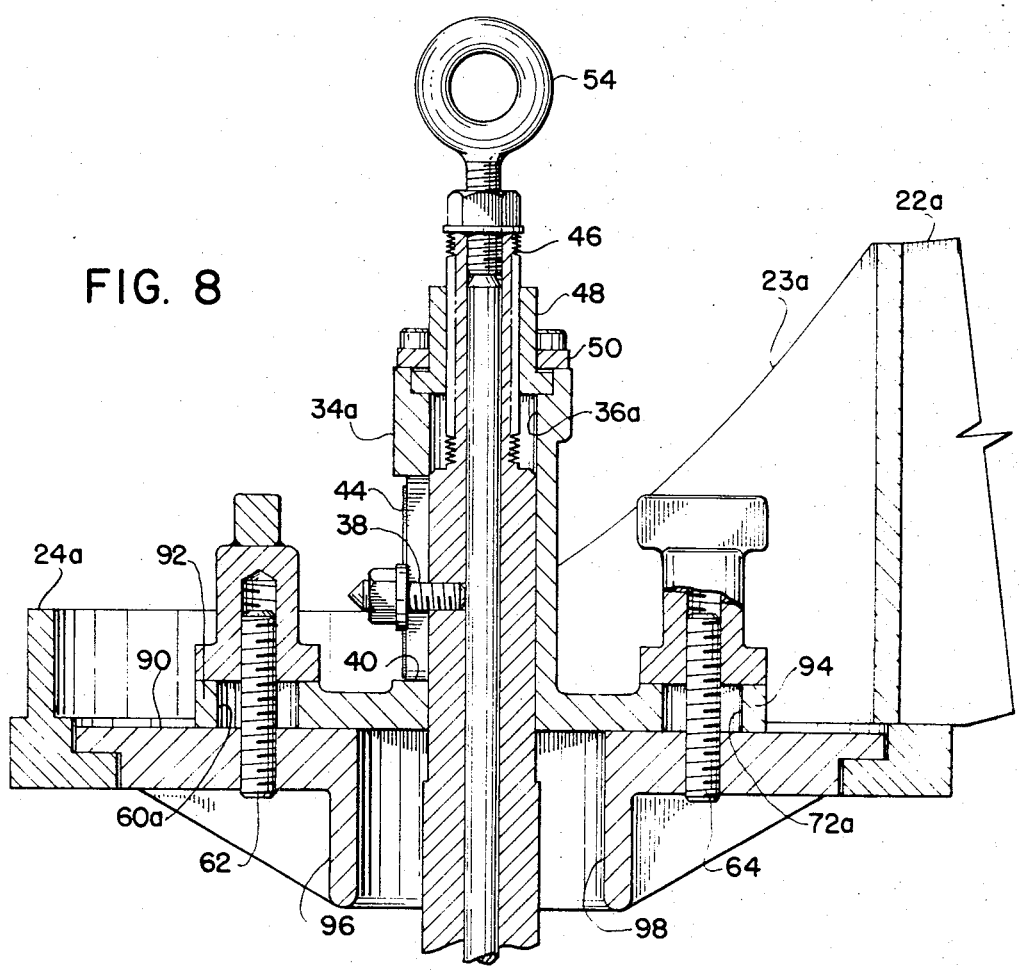
FIG. 8 is a sectional view taken on the line 8—8 of FIG. 7.

In accordance with an alternative embodiment of the present invention, best shown in FIGS. 6, 7 and 8, a plunger carrier 22a includes a head portion 24a which is generally annular and which may be integrally connected to the carrier 22a by means of the arcuate and tapered webs 23a, 23a. The plungers 18, 18 and more particularly the plunger chucks 32, 32 are supported in a circular plate 90, which plate is angularly adjustable in the annular head portion 24a of the carrier so that the plungers can not only be oriented as shown in FIG. 1 with respect to the first embodiment, and 90 degrees to that position as described above with respect to the head portion 24, but so that these plungers can also be oriented at any position intermediate said two positions by merely rotating the plate 80 in the annular portion 24a.

The plunger chucks 32, 32 in the alternative embodiment are identical to those described above with reference to the first embodiment shown in FIGS. 1–5 inclusively and the parts thereof carry the same reference numerals. However, each chuck 32 is supported by a member 34a which is not identical to the support 34 described hereinabove with reference to FIG. 2 and hence carries the subscript a as do other parts of the mechanism shown in FIGS. 6–8 not identical to those described above with reference to FIGS. 1–5. Each plunger is vertically adjustable as in the previous embodiment and a stop screw 38 slides in a slot 40, and has a marker 42 which can be used in conjunction with a scale 44 to pre-position the plunger. Raising and lowering of the plunger chuck 32 is achieved by the eye bolt 54 as described above, and a joint (not shown) is provided between the refractory plunger 18 and its chuck 32 identical to that described hereinabove with reference to the pins 84 and 88, the cylinder 86, the spacer 88 and the rod 80 described hereinabove.

The support member 34a defines a vertical opening 36a in which the plunger chuck 32 is received, and also defines the slot 40 for the stop screw 38. However, instead of being L-shaped as it is counterpart 34 in the previous embodiment, the member 34a has diametrically opposed lands 92 and 94 which define openings 60a and 72a for loosely receiving the threaded studs 62 and 64 respectively. Hand knobs 74 and 66 releasably clamp the lands 92 and 94 to the plate 90 in any particular position. The plate 90 being angularly pre-positioned as described above, and locked in place by suitable means (not shown). The oversize openings 60a and 72a are identical in shape and in function to those described hereinabove with reference to FIG. 5 and it will of course be apparent that a locating pin 56 might be used in the circular opening 60a in the prescribed manner to accomplish the required individual locating of the plungers 18, 18 in the plate 90. The plate 90 is shown in FIG. 8 to have a depending boss 96 which defines an elongated cavity 98 through which the three plunger chucks 32 extend as best shown with reference to FIGS. 6 and 8.

From the foregoing description, it will be apparent that not only can the in-line 3 plunger configuration shown be oriented either for so-called centerline and 90 degree use, but the circular plate permits any orientation therebetween. Moreover, in both embodiments shown herein the plungers are individually adjustable with respect to one another and can be installed and removed individually.

I claim:

1. In a glass gob feeding apparatus wherein three molten glass gobs are to be formed at the outlet spout of a feeder bowl by the action of three side-by-side vertically reciprocable plungers which move toward and away from three side-by-side orifices defined in an orifice plate located in the outlet spout, the improvement comprising a plunger carrier mounted above the feeder bowl for movement toward and away from the outlet spout, said carrier having a circular opening above said outlet spout, a circular head plate having a peripherally extending flange to locate said plate in said carrier opening, said plate having an elongated generally diametrically extending slot for receiving said side-by-side plungers, three plunger chuck supports each of which has central post means for supporting a plunger in depending relation to said feeder bowl, and which chuck support also has opposed lands arranged on opposite sides of said post means for engaging said plate on opposite sides of said elongated slot, means for adjustably mounting each chuck support to said plate including a threaded locating pin snugly received in an opening in one of said lands and threadably received in a first threaded opening in said plate for initially locating said chuck support in said plate in a nominal position, a first stud smaller in size than said locating pin for replacing said pin to allow minor corrections in said chuck support location relative to said plate, and a second stud similar to said first stud and extending through an opening in the opposed land of said chuck support and threadably received in a second threaded opening in said plate for loosely clamping said chuck support during such minor locating corrections and for cooperating with said first stud to clamp said support in a final position, said plate having six threaded openings for receiving first and second studs associated with said three plunger chuck supports.

References Cited

UNITED STATES PATENTS

| | | | |
|---|---|---|---|
| 3,582,309 | 6/1971 | Bracken | 65—328 |
| 3,347,653 | 10/1967 | Carmi et al. | 65—362 |
| 1,885,409 | 11/1932 | Bragg | 65—323 |
| 3,239,326 | 3/1966 | Tyner | 65—330 |

FRANK W. MIGA, Primary Examiner

U.S. Cl. X.R.

65—323, 330, 331